United States Patent [19]

Hoare et al.

[11] Patent Number: 4,627,052
[45] Date of Patent: Dec. 2, 1986

[54] INTERCONNECTION OF COMMUNICATIONS NETWORKS

[75] Inventors: David P. Hoare, Hitchin; David J. Warner, Baldock, both of England

[73] Assignee: International Computers Limited, London, England

[21] Appl. No.: 710,547

[22] Filed: Mar. 11, 1985

[30] Foreign Application Priority Data

Mar. 19, 1984 [GB] United Kingdom ............... 8407102

[51] Int. Cl.[4] ............................ H04J 3/00; H04J 3/24
[52] U.S. Cl. ........................................ 370/88; 370/94; 370/85
[58] Field of Search ............... 370/88, 94, 85, 60, 370/89; 340/825.05

[56] References Cited

U.S. PATENT DOCUMENTS

| | | | |
|---|---|---|---|
| Re. 28,811 | 5/1976 | Pierce | 370/88 |
| 3,597,549 | 8/1971 | Farmer et al. | 370/88 |
| 3,890,471 | 6/1975 | Hachenburg | 370/88 |
| 4,287,592 | 9/1981 | Paulish et al. | 370/94 |

*Primary Examiner*—Douglas W. Olms
*Assistant Examiner*—Wellington Chin
*Attorney, Agent, or Firm*—Lee, Smith & Zickert

[57] ABSTRACT

Communications networks are interconnected by a bridge which allows the stations on each network to communicate with those on the other netowrk. Each station has an identifying address unique in the system. Data is transmitted in the form of packets each containing a source address and a destination address. The bridge includes a table holding addresses of stations in the first network. Whenever the bridge receives a packet from the first network, it compares its destination address with the contents of the table, and if no match is found, transmits the packet on to the second netowrk. The bridge also compares the source address of the packet with the contents of the table and if no match is found, enters that source address into the table. Thus, the contents of the table can be built up by the bridge by a learning process. The bridge handles transmission of packets in the opposite direction by a similar method, using a second table, holding the addresses of stations in the second network.

9 Claims, 4 Drawing Figures

INTERCONNECTION OF COMMUNICATIONS NETWORKS

BACKGROUND TO THE INVENTION

This invention relates to the interconnection of communications networks.

A communications network interconnects a number of stations to allow them to communicate with one another. It is known that such networks may themselves be interconnected by devices sometimes referred to as "bridges" or "gateways" to form a combined network in which station on either of the original networks may communicate with stations on the other network. These interconnection devices are of the store-and-forward type, and transmit messages received from one network on to the other.

There is an especial need for such devices if the networks are local area networks using an access protocol based on carrier-sense multiple access with collision detection, (CSMA/CD) because the span of such networks is limited by the need to keep the maximum propagation delay within a prescribed limit. If two such networks of the maximum span are joined together by such an interconnection device a combined network may be formed whose total span exceeds the limit imposed on a single network.

The use of devices for this purpose is described in "Ethernet: distributed packet switching for local computer networks" by R. M. Metcalfe and D. R. Boggs, Communications of the ACM, July 1976, pages 395 to 404. This paper also points out that the device may carry out address filtering by passing packets from one network to the other only if the destination station is located in the remote network. Address filtering in this manner requires the interconnection device to hold a table or record of the addresses of all stations in the remote network so that it can forward a packet only if its destination address matches one of those held. An advantage of address filtering is that it improves efficiency by reducing the packets transmitted in each of the individual networks.

One object of the present invention is to provide an improved method of address filtering.

SUMMARY OF THE INVENTION

The invention provides a method of transferring data from a first network to a second network,
   each network comprising a plurality of stations interconnected by transmission means,
   each station having an identifying address unique in the two networks, and
   data being transmitted in packets each defining a source address and a destination address,
   the method comprising:
   (a) maintaining an address table holding addresses exclusively of stations in the first network.
   (b) comparing the destination addresses of packets transmitted over the first network with the contents of said table and, if it is detected that the destination address of a packet is not held in said table, transmitting the packet on to the second network, and
   (c) comparing the source addresses of packets transmitted over the first network with the contents of said table and, if it is detected that the source address of a packet is not held in said table, entering that source address into said table.

The address filtering is therefore carried out by blocking from the second network those packets passing over the first network that are detected as having a destination also on the first network. This is in distinction from the prior method desribed above, in which the address filtering is carried out by passing on to the second network those packets passing over the first network that are detected as having a destination on the second network. The method of the invention has the advantage that it will initialise itself automatically from a state in which the table is empty (for example at switch-on). Thus although packets addressed to a station on the first network that has not yet transmitted will be passed on to the second network, once the station has transmitted its address will be entered in the address table and all subsequent packets addressed to that station and originating from a station in the first network will be blocked from being passed to the second network. In most protocols, only a limited number of packets are sent to a station without a reply, so that number of packets that are passed on to the second network unnecessarily is correspondingly limited.

The invention also provides apparatus for interconnecting first and second networks, the apparatus being arranged to receive data packets from the first network, each packet including a source address and a destination address, and to transfer selected ones of those packets to the second network,
   the apparatus comprising:
   (a) a table for holding a plurality of addresses,
   (b) means for comparing the destination address of a packet received from the first network with the contents of said table and, if no match is found, transferring that packet to the second network, and
   (c) means for comparing the source address of a packet received from the first network with the contents of said table and, if no match is found, entering that source address into said table.

The invention further provides a combined network comprising a first and a second network each as specified above connected by apparatus according to the invention.

Preferably the method or apparatus is symmetrical in also passing packets originating from a station of the second network on to the first network in the same manner as it passes them from the first network to the second.

BRIEF DESCRIPTION OF THE DRAWINGS

Networks including interconnection devices and in accordance with the invention will now be described in greater detail by way of example with reference to the accompanying drawings, in which.

DETAILED DESCRIPTION

Figure 1:
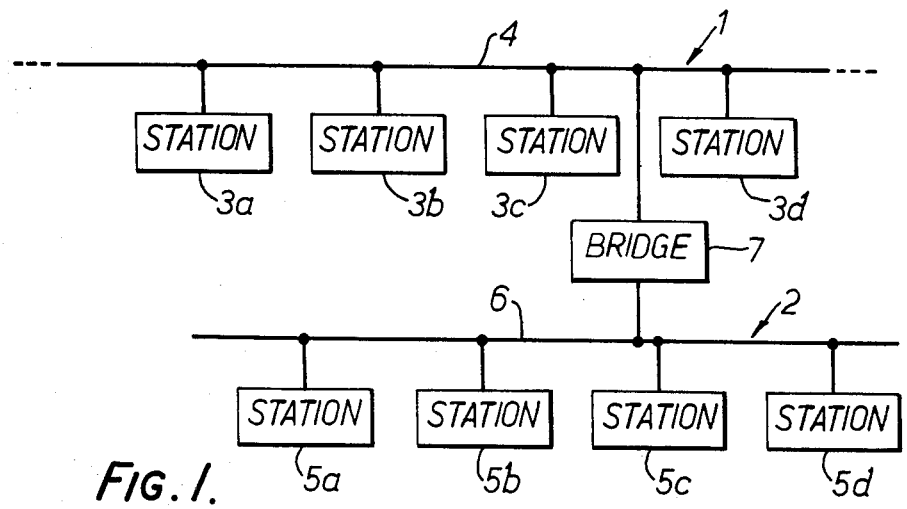
FIG. 1 is a diagram of a first network configuration.

Referring to FIG. 1, the system includes two local area networks 1 and 2. It will be assumed for the present that each is a CSMA/CD network. The network 1 consists of stations 3 (of which 3a to 3d are shown)

connected to a common transmission channel 4 taking the form of a co-axial cable. The stations may for example be computer processors, terminals or peripherals. The network 2 consists of stations 5 (of which 5a to 5d are shown) connected to a channel 6 similar to the channel 2.

The stations 3 of the network 1 can communicate with one another over the channel 4 using the well-known CSMA/CD protocol. The stations transmit data in packets, each of which consists in sequence of a preamble, a destination address, a source address, user data and a frame check sequence. The source and destination addresses are the identifying addresses assigned respectively to the station transmitting the packet and the station for which it is intended. The stations 5 of the network 2 can similarly communicate with one another over the channel 6.

In order to allow stations on one network to communicate with those on the other, an interconnection device 7, which will be termed herein a bridge, is connected between the two channels 4 and 6. The bridge 7, in a manner to be described, ensures that any packet from one of the stations 3 of the network 1 intended for a station 5 of the network 2 will be transmitted onto the channel 6 of the network 2. It also acts similarly in the reverse direction.

For packets to be able to reach the right station it is necessary for the identifying address of each station to be unique in the combined network.

Figure 2:
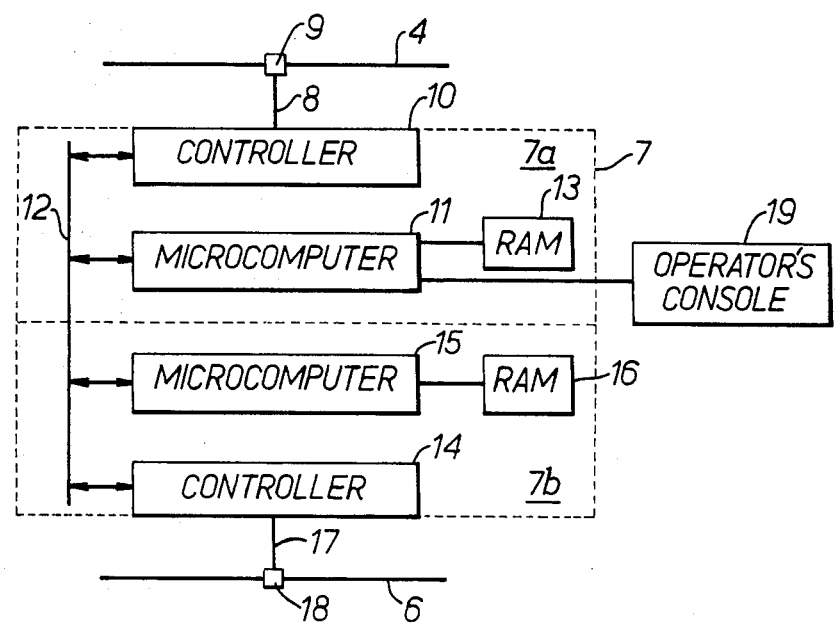
FIG. 2 is a block diagram of an interconnection device.

Referring to FIG. 2, the bridge 7 is constructed in two halves, 7a and 7b, associated respectively with the networks 1 and 2. The half 7a is joined to the channel 4 by a cable 8 ending at a transceiver 9 coupled to the channel 4. The inward terminal of the cable 8 is connected to a local-area-network controller 10. These components are commercially available for a number of protocols including CSMA/CD. For that protocol they are capable of carrying out the carrier sensing and collision detection it requires and transmitting packets when they determine that they are entitled to do so. When transmitting a packet they add the preamble at the start and append a frame check sequence at the end. When receiving a packet they normally recognise if the packet is addressed to the associated station and pass it on if so, stripped of the preamble and frame check sequence, provided the test on the frame check sequence is successful. They are also capable of being set to pass on all packets received that have a correct frame check sequence (once again stripped of preamble and frame check sequence).

Packets received by the controller 9 are passed to a microcomputer 11 over a bus 12. The bus 12 may, for example, be according to the well-known Multibus specification. Attached to the microcomputer 11 is a random-access memory (RAM) 13.

The bus 12 provides the link between the half-bridge 7a and the half-bridge 7b. The latter is generally similar to the former, having a local-area-network controller 14 and a microcomputer 15 to which is attached a RAM 16. A cable 17 connects the controller 14 in the half-bridge 7b to a transceiver 18 coupled to the cable 6.

An operator's console 19 is connected to the microcomputer 11 in the half-bridge 7a.

The operation of the half-bridge 7a will now be described with reference also to FIG. 3, which illustrates the operation diagrammatically.

The microcomputer 11 holds a table 20 in the RAM 13 containing in operation addresses 21 of station 3 in the network 1. Each packet transmitted by one of these stations passes over the channel 4 and is received by the controller 10, from which it is passed as explained to the microcomputer 11. That stores the packet in a section of the RAM 13 arranged as a first-in first-out buffer (FIFO) 22.

As each packet comes to the head of the queue in the FIFO 22, shown as a packet 23, it is processed as follows. The source address 24 and destination address 25 of the packet are extracted and each compared with the addresses 21 held in the table 20 until a match is found. For the comparisons the addresses 21 are loaded successively into a register 26 whose contents are compared with the source address 24 and destination address 25 at blocks 27 and 28 respectively. If the destination address 25 matches the entry held in the register 26 an indication shown as the arrow 29 is produced and comparisons with the destination addresses cease. If the source address 24 matches the entry held in the register 26 an indication shown as the arrow 30 is produced and comparisons with the source addresses cease. The addresses 21 held in the table 20 continue to be retrieved until either both source and destination addresses have been found in the table or all the entries have been retrieved.

If all the entries are retrieved without the destination address having been found, the packet 23 is transferred to the microcomputer 15 in the other half-bridge 7b, from where it is transferred to the controller 14. That transmits it over the network 2.

If all the entries are retrieved without the source address having been found the source address is entered into the table 20 provided there is still free space for it.

The comparisons of the source and destination addresses with an entry are in practice carried out using the arithmetic and logic unit of the microprocessor 11 for both comparisons, one after the other.

Once the processing of the packet 23 has been completed the next packet in the FIFO 22 is processed in the same way in its turn.

Thus packets from one station 3 of the network 1 addressed to another station of that network, 3a to 3b say, will not be passed to the network 2 provided the address of the destination 3b has already been entered in the table 20. That will occur the first time the station 3b sends a packet whether to a station in its network 1 or to a station in the other network 2. So until a station 3 has transmitted, the packets that are addressed to it from any other station 3 will be transmitted on to the other network 2. They will do no harm there, except using up some of its bandwidth.

The number of packets passed unnecessarily to the other network before the destination station is entered into the table 20 will normally be small, since most protocols require acknowledgement of packets. That ensures that a packet will be drawn from the destination (provided it is active) and will lead to its address being entered into the table 20. If the station is inactive other stations will not persevere in attempting to transmit to it. Alternatively, if desired, a station can be arranged to transmit a dummy packet as soon as it becomes active, in order to ensure it is entered in the table 20 at once.

The other half-bridge 7b behaves in similar fashion and passes packets from the network 1 provided its address table in the RAM 16, which holds addresses of stations on the network 2, does not contain the packet's destination.

Since each half-bridge holds a table just of addresses in its associated network the comparisons are very simple and are carried out by separate means for the two directions. These means operate independently in carrying out the comparison, which take place in parallel for the two directions if packets from both networks are waiting to be processed. Simultaneous processing in this manner improves the throughput of the bridge 7.

It will be realised that if the bridge 7 is brought into operation with the address table 20 in the half-bridge 7a and its counterpart in the other half-bridge 7b both empty then the system will initialise itself automatically as packets start to pass and entries are made in the tables. It is also possible to enter addresses under operator control through the console 13.

Once the address tables are full, packets to any unrecorded station of the same network will be forwarded to the other network, again without harm except loss of bandwidth. If desired the tables may be periodically purged and re-initialised.

The bridge 7 allows two networks each of the maximum allowable span to be interconnected to form a combined network that exceeds that maximum. It also reduces congestion in each component network compared to a simple repeater for all packets because it keeps from each component network some at least of the packets passing from one station to another on the other network. Often most communication will be between stations on the same network, so the number of packets passed over the bridge will be quite a small fraction of the total, with a corresponding benefit in reducing congestion.

Packets with a broadcast destination address will be passed through the bridge since their destination does not correspond to any actual source that can have been entered into the address tables. Multicast addresses applying to stations in one network only may be entered by operator control into the appropriate table to ensure that packets with that address are kept to the network concerned.

Figure 4:
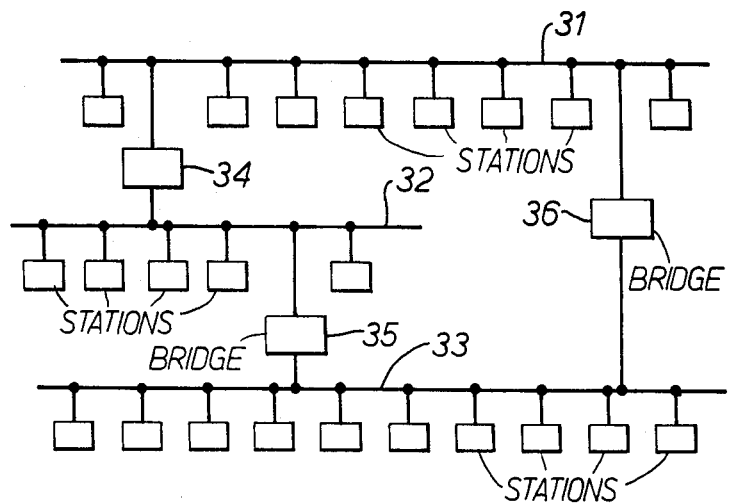
FIG. 4 is a diagram of a second network configuration.

Each network to which the bridge is joined may itself be a composite network including bridges. An example is shown in FIG. 4, in which there are three networks 31, 32 and 33 interconnected by bridges 34, 35 and 36 each like the bridge 7.

All three bridges must not be operative simultaneously, because otherwise multiple paths and looping would occur, resulting in conflicting versions of the same packet being propagated. The operative bridges must be selected to ensure that the combined network remains a tree. Selection takes place under operator control via the console of one of the bridges. Each half-bridge has its own network address, so that the operator may communicate with the bridges and set them to be operative in passing packets as required.

Figure 3:
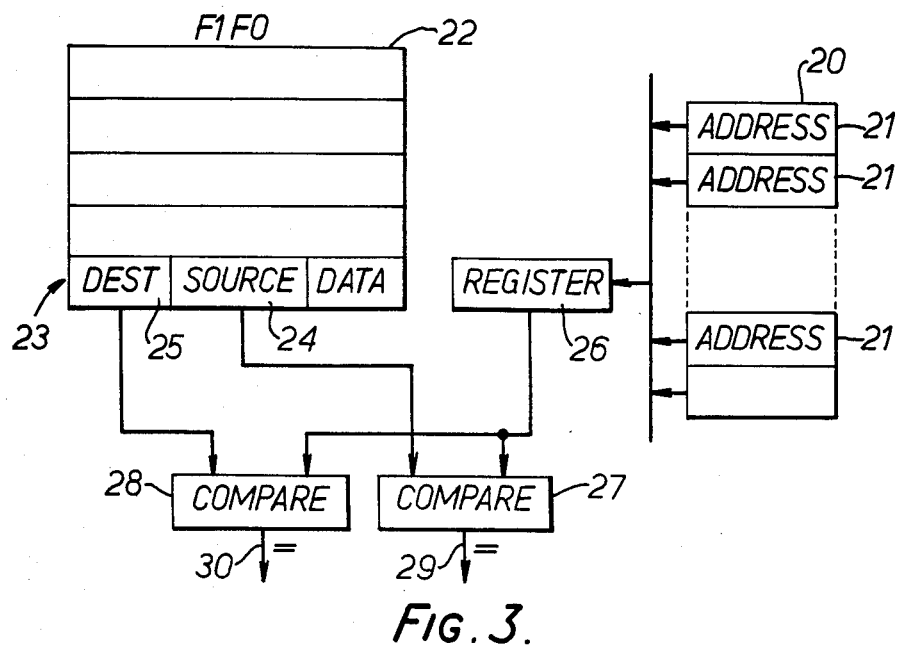
FIG. 3 illustrates the structure of a half-bridge forming part of the interconnection device.

In the example of FIG. 3, assume that the bridge 36 is set inoperative so that it passes no packets and the bridges 34 and 35 are set operative to pass packets. Then, when initialised, the bridge 34 will hold the addresses of the network 31 in one table and the addresses of the networks 32 and 33 in the other. It regards the combined networks 32 and 33 as the second network to which it is connected. Similarly the bridge 35 will hold the addresses of the network 33 in one table and of the combined network 31 and 32 in the other. So a packet from a station in the network 31 destined for a station of the network 33 will pass successively through the bridges 34 and 35. A packet from a station on the network 32 destined for a station of the network 31 will be passed through bridge 34, but will be blocked by bridge 35.

If now the bridge 35 is rendered inoperative and the bridge 36 operative, packets for the network 32 from the network 33 will reach it via the bridges 36 and 34. Additional entries will be made in the address table of the half-bridge of bridge 34 nearer the network 31 since it will now see the stations of the network 33 as belonging to a combined network connected to that half-bridge. The table in the half-bridge of the bridge 34 nearer the network 32 is cleared, to remove the addresses of the network 33 which are no longer required.

The bridges have a maximum rate of throughput in either direction depending on the time needed to process a packet. If packets pass over either network at a greater rate the bridge will be unable to accept them and they will not be passed on to the other network. In that case, if the destination was in that other network, higher levels of the protocol will need to detect and recover from the failure.

Various modifications may be made to the system described. Thus the protocols used in the two networks need not be the same. While in the described system only the minimum necessary contents of the packet are passed from one half-gateway to the other, if desired the frame check sequence may also be included in the contents of the packet passed from one half-bridge to the other. That allows an end-to-end check, including the correctness of the data transfer from one half-bridge to the other.

The use of the bus 12 to interconnect the two half-bridges 7a and 7b imposes an upper limit on the separation between the points of the channels 4 and 6 that are joined. To overcome this limitation, the half-bridges may be in separate cabinets each with its own bus, the half-bridges being joined by a transmission channel between the microcomputers 11 and 15.

The method of address comparison described above is satisfactory provided the addresses are not too long. For example, if the microcomputers 11 and 15 use Intel 8086's, the address comparison can be carried out speedily using the 8086's string and search instruction. However, one current addressing scheme allots a globally unique 48-bit address to each participating device. The leading 24 bits designate the manufacturer and the trailing 24 bits are assigned by the manufacturer to distinguish uniquely between each of the items he manufactures. This scheme has the advantage for this invention that it ensures that addresses in a combined network will be unique. To cope with such long addresses, the method described above with reference to the drawings can advantageously be modified as follows.

The address table 20 is split into two parts. One holds, in successive locations, the trailing 16 bits of each address. The other holds the remaining 32 bits of each address. Then, using the string word search instruction, the trailing 16 bits of the source or destination address are compared with the trailing 16 bits of each successive recorded address from the first part of the table until a match is found. Only at that point is it necessary to retrieve the initial 32 bits of the address from the second part of the table for a separate comparison to determine if that part also matches. It is found that most variation in addresses in a given network occurs in the final 16 bits, so this method proceeds very quickly with no retrieval of the initial 32 bits until a match is in fact found.

It will be realised that the microcomputer-based implementation described above could very well be replaced by special-purpose hardware.

We claim:

1. A method of transferring data from a first network to a second network, each network comprising a plurality of stations interconnected by transmission means, each station having an identifying address unique in the two networks, and data being transmitted in packets each defining a source address and a destination address, the method comprising:
   (a) maintaining an address table holding addresses exclusively of stations in the first network,
   (b) comparing the destination addresses of packets transmitted over the first network with the contents of said table and, if it is detected that the destination address of a packet is not held in said table, transmitting the packet on to the second network, and
   (c) comparing the source addresses of packets transmitted over the first network with the contents of said table and if it is detected that the source address of a packet is not held in said table, entering that source address into said table.

2. Apparatus for interconnecting first and second networks, comprising
   (a) means for receiving data packets from the first network, each packet including a source address and a destination address,
   (b) a table for holding a plurality of addresses,
   (c) means for comparing the destination address of a packet received from the first network with the contents of said table and, if no match is found, transferring that packet to the second network, and
   (d) means for comparing the source address of a packet received from the first network with the contents of said table and, if no match is found, entering that source address into said table.

3. Apparatus according to claim 2 further including a buffer for temporarily storing each packet received from the first network.

4. Apparatus according to claim 3 wherein said buffer is a first-in-first-out buffer.

5. Apparatus according to claim 2, further including
   (a) means for receiving data packets from the second network, each packet including a source address and a destination address
   (b) a further table for holding a plurality of addresses,
   (c) means for comparing the destination address of a packet received from the second network with the contents of said further table and, if no match is found, transferring that packet to the first network, and
   (d) means for comparing the source address of a packet received from the second network with the contents of said further table and, if no match is found, entering that source address into said further table.

6. Apparatus according to claim 2 wherein each address comprises first and second portions, and wherein each said means for comparing is operative to compare the first portions of the specified addresses and to compare the second portions of the specified addresses only if the first portions are found to be equal.

7. Apparatus according to claim 5 wherein said means for comparing the source address of a packet received from the second network is operable simultaneously with said means for comparing the source address of a packet received from the first network.

8. A communications system comprising first and second networks, each network comprising a plurality of stations interconnected by transmission means and each station having an identifying address unique in the system, the networks being interconnected by apparatus comprising:
   (a) means for receiving data packets from the first network, each packet including a source address and a destination address,
   (b) a table for holding a plurality of addresses,
   (c) means for comparing the destination address of a packet received from the first network with the contents of said table and, if no match is found, transferring that packet to the second network, and
   (d) means for comparing the source address of a packet received from the first network with the contents of said table and, if no match is found, entering that source address into said table.

9. A communications system comprising at least three networks, each network comprising a plurality of stations interconnected by transmission means and each station having an identifying address unique in the system, wherein each pair of networks is interconnected by apparatus comprising
   (a) means for receiving data packets from a first network of said pair, each packet including a source address and a destination address,
   (b) a table for holding a plurality of addresses,
   (c) means for comparing the destination address of a packet received from the first network with the contents of said table and, if no match is found, transferring that packet to a second network of said pair, and
   (d) means for comparing the source address of a packet received from the first network with the contents of said table and, if no match is found, entering that source address into said table.

* * * * *